United States Patent
Silverman et al.

(10) Patent No.: US 12,111,895 B2
(45) Date of Patent: Oct. 8, 2024

(54) GROUP-BASED AUTHENTICATION TECHNIQUE

(71) Applicant: Veracity, Inc., Novato, CA (US)

(72) Inventors: Shmuel Silverman, Novato, CA (US); Steven E. Stupp, Foster City, CA (US)

(73) Assignee: Veracity, Inc., Novato, CA (US)

( * ) Notice: Subject to any disclaimer, the term of this patent is extended or adjusted under 35 U.S.C. 154(b) by 426 days.

(21) Appl. No.: 17/371,109

(22) Filed: Jul. 9, 2021

(65) Prior Publication Data

US 2022/0012314 A1    Jan. 13, 2022

Related U.S. Application Data

(60) Provisional application No. 63/140,254, filed on Jan. 21, 2021, provisional application No. 63/049,636, filed on Jul. 9, 2020.

(51) Int. Cl.
*G06F 21/31*    (2013.01)
*H04L 9/40*    (2022.01)
(Continued)

(52) U.S. Cl.
CPC .......... *G06F 21/31* (2013.01); *H04L 63/0876* (2013.01); *H04Q 9/00* (2013.01); *H04W 12/06* (2013.01); *H04Q 2209/40* (2013.01)

(58) Field of Classification Search
CPC ....... G06F 21/31; H04L 63/0876; H04Q 9/00; H04Q 2209/40
See application file for complete search history.

(56) References Cited

U.S. PATENT DOCUMENTS 6,651,481 B1 * 11/2003 Youngquist .......... G01L 27/005
  250/252.1
8,868,923 B1 * 10/2014 Hamlet .................. G06F 21/00
  326/8
(Continued)

FOREIGN PATENT DOCUMENTS

EP     3663944     6/2020
WO  2019190619    10/2019

OTHER PUBLICATIONS

NPL Todd Bauer and Jason Hamlet; Physical Unclonable Functions: A Primer; Building Security in; Sandia National Laboratories; SAND2014-19298J, pp. 1-8, 2014 (Year: 2014).*

*Primary Examiner* — Vance M Little
(74) *Attorney, Agent, or Firm* — Steven Stupp

(57) ABSTRACT

During operation, an electronic device may receive, from a second electronic device, information that specifies or that corresponds to one or more distortions, where the one or more distortions are associated with measurements of a physical parameter that are performed by a sensor in the second electronic device. Then, the electronic device may determine, based at least in part on the information, the one or more distortions. Moreover, the electronic device may compare the determined one or more distortions with historical values of the one or more distortions. Note that the historical values of the one or more distortions may be specified by or may correspond to historical information that is received from one or more third electronic devices. Next, based at least in part on the comparison, the electronic device may selectively authenticate an individual associated with the second electronic device.

20 Claims, 10 Drawing Sheets

(51) Int. Cl.
    *H04Q 9/00* (2006.01)
    *H04W 12/06* (2021.01)

(56) References Cited

U.S. PATENT DOCUMENTS

| | | | | |
|---|---|---|---|---|
| 9,154,948 | B2* | 10/2015 | Khare | H04W 12/068 |
| 9,461,980 | B1* | 10/2016 | Agrawal | H04L 63/08 |
| 9,477,825 | B1* | 10/2016 | Sinchak | H04L 63/08 |
| 9,801,066 | B1 | 10/2017 | Hanley et al. | |
| 9,875,357 | B2 | 1/2018 | Chen et al. | |
| 10,107,855 | B1* | 10/2018 | Corbett | G01R 31/2851 |
| 10,114,935 | B2 | 10/2018 | Das et al. | |
| 10,536,857 | B1 | 1/2020 | Sloane et al. | |
| 2006/0244742 | A1* | 11/2006 | Nakamura | G03B 21/14 |
| | | | | 345/204 |
| 2008/0170660 | A1* | 7/2008 | Gudmundson | G06F 18/28 |
| | | | | 378/57 |
| 2011/0243214 | A1* | 10/2011 | Wolcott | H04L 25/03343 |
| | | | | 375/232 |
| 2013/0055348 | A1* | 2/2013 | Strauss | G06F 21/31 |
| | | | | 726/3 |
| 2013/0233608 | A1* | 9/2013 | Feng | H01L 21/76834 |
| | | | | 174/266 |
| 2014/0289833 | A1* | 9/2014 | Briceno | H04L 9/006 |
| | | | | 726/5 |
| 2014/0354300 | A1* | 12/2014 | Ramachandran | A61B 6/547 |
| | | | | 324/654 |
| 2015/0242605 | A1* | 8/2015 | Du | G06F 21/32 |
| | | | | 726/7 |
| 2016/0164866 | A1* | 6/2016 | Oberheide | H04L 63/0853 |
| | | | | 726/1 |
| 2016/0269186 | A1* | 9/2016 | Wallrabenstein | G09C 1/00 |
| 2017/0180363 | A1 | 6/2017 | Smith et al. | |
| 2017/0227995 | A1 | 8/2017 | Lee | |
| 2019/0027433 | A1* | 1/2019 | Kaltalioglu | H01L 21/30604 |
| 2020/0096363 | A1* | 3/2020 | Kollmitzer | G01D 21/00 |
| 2020/0178077 | A1 | 6/2020 | Dutt et al. | |
| 2021/0234710 | A1* | 7/2021 | Facon | H04L 9/3278 |
| 2022/0029836 | A1* | 1/2022 | Qureshi | H04L 9/0643 |

\* cited by examiner

GROUP-BASED AUTHENTICATION TECHNIQUE

CROSS REFERENCE TO RELATED APPLICATIONS

This application claims priority under 35 U.S.C. 119(e) to U.S. Provisional Application Ser. No. 63/140,254, entitled "Group-Based Authentication Technique," by Shmuel Silverman, filed on Jan. 21, 2021, and to U.S. Provisional Application Ser. No. 63/049,636, entitled "Securing Authentication Using Personal Electronic Devices," by Shmuel Silverman, filed on Jul. 9, 2020, the contents of both of which are herein incorporated by reference.

FIELD

The described embodiments relate to techniques for securely authenticating an individual. Notably, the described embodiments relate to securely authenticating an individual based at least in part on one or more distortions of measurements performed by a sensor in an electronic device associated with the individual.

BACKGROUND

Social, economic and political graces arising from personal privacy typically require personal independence, sovereignty and agency over what others can learn about us. However, authentication and verification of a person has become increasingly prevalent and invasive, and usually is required for most applications on an electronic device, such as a smart device, e.g., a cellular telephone. In addition, there is a high occurrence of fraud in the financial sector, such as during financial transactions. The need to authenticate and track users and potential clients by large corporations and advertising agencies is often the driver behind many privacy incursions and new intrusions on privacy.

Moreover, the question of what is the best or a preferred way to authenticate a person while maintaining his or her privacy has never been solved correctly or efficiently, so that a resulting general authentication technique can be used daily. Furthermore, electronic devices that office secure identities, such as Rivest Shamir Adleman (RSA)-based electronic devices, usually only identify a given electronic device and not the owner of the electronic device, because they work for any owner regardless or whether or not they are the right or correct individual.

Consequently, there remains a need for providing trusted authentication of an individual while maintaining his or her privacy.

SUMMARY

In a first group of embodiments, an electronic device that selectively authenticates an individual is described. This electronic device may include: an interface circuit that communicates with a second electronic device that includes a sensor that performs measurements of a physical parameter, where the measurements of the physical parameter performed by the sensor include one or more distortions associated with the sensor; a computation device (such as a processor) that executes program instructions; and memory that stores the program instructions. During operation, the electronic device receives, associated with the second electronic device (e.g., from the second electronic device), information that specifies or that corresponds to the one or more distortions. Then, the electronic device determines, based at least in part on the information, the one or more distortions. Moreover, the electronic device compares the determined one or more distortions with historical values of the one or more distortions. Next, based at least in part on the comparison, the electronic device selectively authenticates the individual associated with the second electronic device.

Moreover, the determining of the one or more distortions may include computing the one or more distortions based at least in part on the information that specifies or that corresponds to the one or more distortions. Alternatively or additionally, the information that specifies or that corresponds to the one or more distortions may include the one or more distortions.

Note that the comparing may include the electronic device receiving, associated with one or more third electronic devices (e.g., from the one or more third electronic devices), historical information that specifies or that corresponds to historical values of the one or more distortions. For example, the one or more third electronic devices may be included in a community associated with or specified by the individual, and the electronic device may request and receive the historical information from the one or more third electronic devices, which previously received the historical information from the second electronic device. Alternatively or additionally, the one or more third electronic device may have communicated with the second electronic device during a time interval, and may have received the historical information that specifies or that corresponds to the historical values of the one or more distortions from the second electronic device. Thus, the one or more third electronic devices may be included in a network of the second electronic device and, therefore, in a social graph of the individual.

Furthermore, the comparing the determined one or more distortions with the historical values of the one or more distortions may include computing the historical values of the one or more distortions based at least in part on the historical information that specifies or that corresponds to the historical values of the one or more distortions. Alternatively or additionally, the historical information that specifies or that corresponds to the historical values of the one or more distortions may include the historical values of the one or more distortions.

Additionally, the information that specifies or that corresponds to the one or more distortions may not include the measurements of the physical parameter.

In some embodiments, the selective authentication may be performed without the electronic device accessing previously stored information about the one or more distortions or the measurements of the physical parameter.

Moreover, the physical parameter may include: sound, an image, an acceleration of the second electronic device, an orientation of the second electronic device, a location of the second electronic device (such as information associated with a Global Positioning System), a temperature, a humidity, electrical noise, and/or another type of measurement. Note that the physical parameter may be associated with an environment that includes the second electronic device.

Furthermore, the one or more distortions may include: a nonlinearity, analog distortion or a moment of a noise distribution of the measurements of the physical parameter (such as a mean noise, a root-mean-square noise, a standard deviation in the measurements of the physical parameter, etc.).

Additionally, the one or more distortions may by uniquely associated with the sensor and, thus, with the second electronic device.

In some embodiments, the individual may have a predefined association with the second electronic device.

Note that the information that specifies or that corresponds to the one or more distortions may be secure. For example, the information that specifies or that corresponds to the one or more distortions may be hashed using a secure hash function that is known to the electronic device and the second electronic device. In some embodiments, the information that specifies or that corresponds to the one or more distortions may be combined with a predefined vector (such as a random or a pseudorandom number or string) and/or may be encrypted using information known to the electronic device and the second electronic device. Thus, in some embodiments, the determining of the one or more distortions may include reversing the securing of the information that specifies or that corresponds to the one or more distortions.

Another embodiment provides the second electronic device or one of the third electronic devices, which perform counterpart operations to at least some of the aforementioned operations.

Another embodiment provides a computer-readable storage medium for use with the electronic device, the second electronic device or the one of the third electronic devices. When executed by the electronic device, the second electronic device or the one of the third electronic devices, this computer-readable storage medium causes the electronic device, the second electronic device or the one of the third electronic devices to perform at least some of the aforementioned operations.

Another embodiment provides a method, which may be performed by the electronic device, the second electronic device or the one of the third electronic devices. This method includes at least some of the aforementioned operations.

In a second group of embodiments, a second electronic device that selectively authenticates an individual is described. This second electronic device may include: an interface circuit that communicates with one or more other electronic devices via a wireless network; a set of one or more sensors; a computation device (such as a processor) that executes program instructions; and memory that stores the program instructions. During operation, the second electronic device measures, during a time interval, values of a set of one or more attributes associated with an environment of the second electronic device and associated with a set of one or more characteristics of the set of one or more sensors, where a given characteristic in the set of one or more characteristics is associated with a given sensor in the set of one or more sensors. Then, the second electronic device stores the measured values in the memory. Moreover, after measuring the values, the second electronic device communicates with an electronic device, where, while performing the communication, the second electronic device: provides, to the electronic device (e.g., addressed to the electronic device), the measured values; receives, associated with the electronic device (e.g., from the electronic device), second measured values; receives, associated with at least a third electronic device (e.g., from at least the third electronic device), historical instances of the measured values and the second measured values; computes a risk metric associated with a transaction based at least in part on the measured values, the second measured values and the historical instances of the measured values and the second measured values, where the risk metric corresponds to an authentication probability of a user of the second electronic device (e.g., an individual) and/or a second user of the electronic device (e.g., another individual); and selectively performs an additional action based at least in part on the computed risk metric.

Note that the communication may include establishing a connection with the electronic device.

Moreover, the computing may include comparing the measured values to the historical instances of the measured values associated with a set of one or more environments of the electronic device. For example, a given measured value may correspond to measurements in a given environment in the set of one or more environments.

Furthermore, the second electronic device may dynamically modify the time interval based at least in part the computed risk metric.

Additionally, a given measured value may correspond to a convolution of a given stimulus in the environment and the given characteristic.

In some embodiments, a given measured value may correspond to a distortion associated with the given sensor. For example, the given characteristic may include: a transfer function associated with the given sensor, or noise associated with the given sensor.

Note that the measuring of the values during the time interval may be non-continuous as a function of time.

Moreover, the measured values may be integrated or averaged over the time interval.

Furthermore, the set of one or more sensors may include: a microphone, an accelerometer, an image sensor, an orientation sensor, or a temperature sensor.

Additionally, the set of one or more attributes may include: a lighting condition, vibration, noise, or temperature.

In some embodiments, the additional action may include performing an additional operation to authenticate the user and/or the second user. For example, the additional action may include providing an alert and/or discontinuing the transaction.

Note that the received historical instances of the measured values and the second measured values may be associated with a set of one or more electronic devices (such as the one or more third electronic devices), and the set of one or more electronic devices may include the electronic device and/or the third electronic device.

Moreover, the set of one or more sensors may include a sensor having an accuracy that fails to meet a manufacturing specification for the sensor.

Furthermore, one or more of the measured values, the second measured values, or the historical instances of the measured values and the second measured values may be obfuscated to protect privacy of users of the second electronic device and/or the electronic device.

Another embodiment provides the electronic device or the third electronic device, which perform counterpart operations to at least some of the aforementioned operations.

Another embodiment provides a computer-readable storage medium for use with the second electronic device, the electronic device or the third electronic device. When executed by the second electronic device, the electronic device or the third electronic device, this computer-readable storage medium causes the second electronic device, the electronic device or the third electronic device to perform at least some of the aforementioned operations.

Another embodiment provides a method, which may be performed by the second electronic device, the electronic device or the third electronic device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
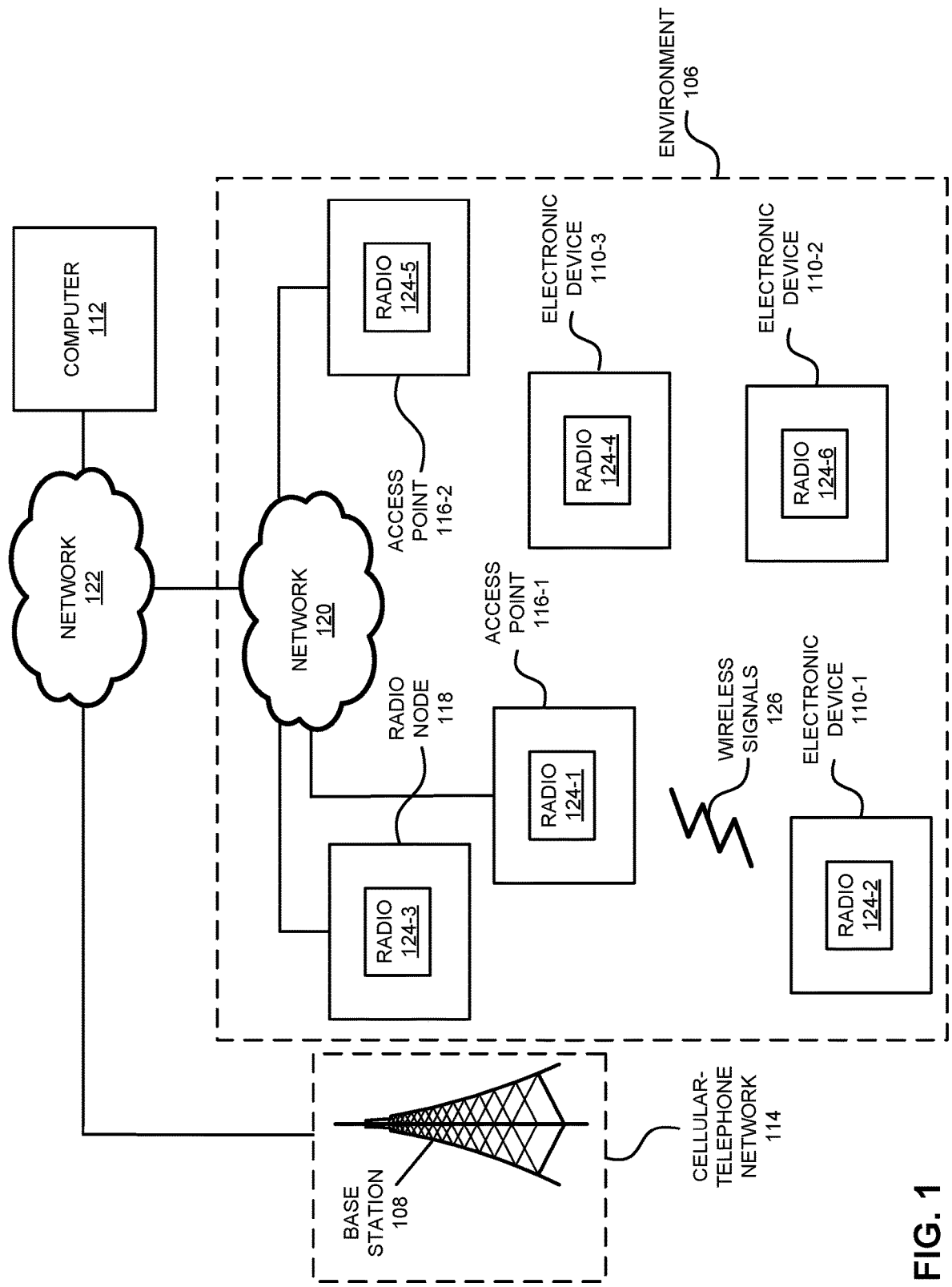
FIG. 1 is a block diagram illustrating an example of communication among electronic devices in a system in accordance with an embodiment of the present disclosure.

An electronic device that selectively authenticates an individual is described. During operation, the electronic device may receive, from a second electronic device, information that specifies or that corresponds to one or more distortions, where the one or more distortions are associated with measurements of a physical parameter that are performed by a sensor in the second electronic device. Then, the electronic device may determine, based at least in part on the information, the one or more distortions. Moreover, the electronic device may compare the determined one or more distortions with historical values of the one or more distortions. Note that the historical values of the one or more distortions may be specified by or may correspond to historical information that is received from one or more third electronic devices in a community associated with or specified by the individual, or that communicated with the second electronic device during a time interval. Next, based at least in part on the comparison, the electronic device may selectively authenticate the individual associated with the second electronic device.

By selectively authenticating the individual, these authentication techniques may provide the advantages of authenticating without compromising privacy of the individual. Notably, the second electronic device may not provide the measurements of the physical parameter to the electronic device or the one or more third electronic devices. In addition, when performing the selective authentication (and, thus, the aforementioned operations), the electronic device may not access or use previously stored information about the one or more distortions or the measurements of the physical parameter. Consequently, the authentication techniques may provide secure and private approach for authenticating the individual, which may enable selective access to resources (such as a computer network) or conducting or a transaction without requiring that the individual compromise their privacy (such as by providing the measurements of the physical parameters). Therefore, the authentication techniques may improve the user experience, which may facilitate adoption of the authentication techniques.

We now describe some embodiments of the authentication techniques. In the discussion that follows, Long Term Evolution or LTE (from the 3rd Generation Partnership Project of Sophia Antipolis, Valbonne, France) is used as an illustration of a data communication protocol that is used one or more radio nodes in a cellular-telephone network. The one or more radio nodes may facilitate communication in the authentication techniques between a computer or a server, an electronic device associated with a user (such as the individual) and/or one or more other electronic devices. Consequently, the one or more radio nodes may include an Evolved Node B (eNodeB) or eNBs. In some embodiments, the communication protocol used by the one or more radio nodes may include: a third generation or 3G communication protocol, a fourth generation or 4G communication protocol, e.g., LTE, LTE Advanced or LTE-A, a fifth generation or 5G communication protocol, or other present or future developed advanced cellular communication protocol. Therefore, in other embodiments, the one or more radio nodes may include: a Universal Mobile Telecommunications System (UMTS) NodeB and radio network controller (RNC), or a New Radio (NR) gNB or gNodeB (which communicate with a network with a cellular-telephone communication protocol that is other than LTE).

Alternatively or additionally, an Institute of Electrical and Electronics Engineers (IEEE) 802.11 standard (which is sometimes referred to as 'Wi-Fi,' from the Wi-Fi Alliance of Austin, Texas) is used as an illustration of a communication protocol that is used by an access point in a wireless local area network (WLAN) to facilitate the communication between the computer or the server, the electronic device and/or the one or more other electronic devices. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. However, a wide variety of communication techniques or protocols may be readily used in various embodiments. For example, an electronic device and a radio node or an access point may communicate frames or packets in accordance with a wireless communication protocol, such as: Bluetooth (from the Bluetooth Special Interest Group of Kirkland, Washington), and/or another type of wireless interface.

Moreover, a radio node or the access point may communicate with other access points, radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication in an environment 106 with one or more electronic devices 110 (such as cellular telephones, portable electronic devices, stations or clients, another type of electronic device, etc.) via a cellular-telephone network 114 (which may include a base station 108), one or more access points 116 (which may communicate using Wi-Fi) in a WLAN and/or one or more radio nodes in a network (such as radio node 118), which may communicate using LTE (such as a small cell or a cellular-telephone network). In the discussion that follows, an access point, a radio node or a base station are sometimes referred to generically as a 'communication device.' Moreover, as noted previously, one or more base stations (such as base station 108), access points 116, and/or radio node 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio node 118 may communicate with each other and/or computer 112 (which may be a cloud-based computer or server) using a wired communication protocol (such as Ethernet) via network 120 and/or 122. Note that networks 120 and 122 may be the same or different networks. For example, networks 120 and/or 122 may an LAN, an intra-net or the Internet.

Figure 10:
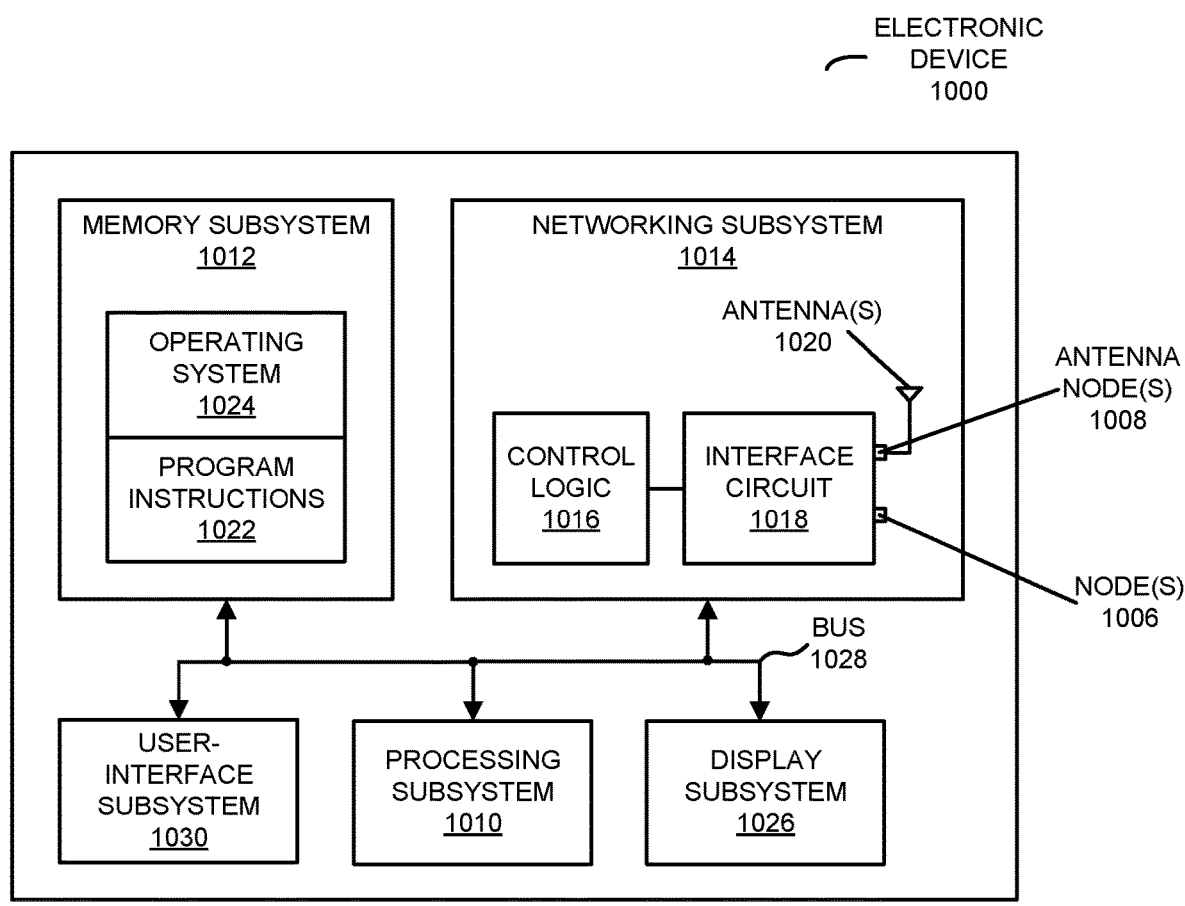
FIG. 10 is a block diagram illustrating an example of an electronic device in accordance with an embodiment of the present disclosure.

As described further below with reference to FIG. 10, electronic devices 110, computer 112, access points 116, and radio node 118 may include subsystems, such as a networking subsystem, a memory subsystem and a processor subsystem. In addition, electronic devices 110, access points 116 and radio node 118 may include radios 124 in the networking subsystems. More generally, electronic devices 110, access points 116 and radio node 118 can include (or can be included within) any electronic devices with the networking subsystems that enable electronic devices 110, access points 116 and radio node 118 to wirelessly communicate with one or more other electronic devices. This wireless communication may include transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio node 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio node 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio node 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Although we describe the network environment shown in FIG. 1 as an example, in alternative embodiments, different numbers or types of electronic devices may be present. For example, some embodiments include more or fewer electronic devices. As another example, in another embodiment, different electronic devices are transmitting and/or receiving packets or frames.

As discussed previously, it can be difficult to authenticate an individual (e.g., during a transaction between electronic devices 110-1 and 110-2) without compromising the privacy of the individual. As described further below with reference to FIGS. 2-9, in order to address these problems, electronic devices 110-1, 110-2 and/or 110-3 may perform an embodiment of the authentication techniques.

Notably, electronic devices 110 may include instances of one or more sensors that are used to perform measurements of physical parameters in environments of electronic devices 110. Because of limitations of the instances of the one or more sensors (and their associated electronics and measurement circuits), these measurements may include one or more distortions that are uniquely associated with the instances of the one or more sensors and the environments in which they perform the measurements. For example, the measurements associated with a given sensor in a given electronic device may include one or more distortions that uniquely specify the given sensor and the environments in which the given sensor performed the measurements.

In the authentication techniques, information that specifies or that corresponds to (or is a function of) the one or more distortions is shared among electronic devices 110. Notably, the information may be shared: whenever a given pair of electronic devices communicate with each other; periodically, such as once per hour or day; and/or as needed, such as when an attribute of the environment of a given electronic device changes, or when the given electronic device is moved to a different environment, such as a different room, from home to work, from a building to a car, etc.). Alternatively or additionally, the information may be shared when it is requested by a given electronic device and/or when an instruction to share the information is received. After receiving the information from another electronic device (such as electronic device 110-2), a given electronic device (such as electronic device 110-1) may store the information in memory with an identifier of the other electronic device (such as a media access control or MAC address, a cellular-telephone number, etc.) for subsequent access and use.

For example, electronic device 110-1 may measure, during a time interval, values of a set of one or more attributes associated with an environment of electronic device 110-1 and associated with a set of one or more characteristics of the set of one or more sensors (such as one or more distortions), where a given characteristic in the set of one or more characteristics is associated with a given sensor in a set of one or more sensors in electronic device 110-1. Then, electronic device 110-1 may store the measured values in memory in electronic device 110-1. Moreover, after measuring the values, electronic device 110-1 may communicate information that specifies or corresponds to the set of one or more characteristics with electronic device 110-2.

In some embodiments, while performing the communication, electronic device 110-1 may: provide, to electronic device 110-2, the measured values; receive, from electronic device 110-2, second measured values (which may have been measured using a set of one or more sensors in electronic device 110-2); receive, from at least a third electronic device (such as electronic device 110-3), historical instances of the measured values and/or the second measured values (which may have been previously received by electronic device 110-3 from, respectively, electronic device 110-1 and/or electronic device 110-2); compute a risk metric associated with a transaction based at least in part on the measured values, the second measured values, the historical instances of the measured values and/or the second measured values (e.g., based at least in part on a weighted difference of features in given measured values relative historical instances of the given measured values, or the output of a pretrained predictive model, such as a machine-learning model or a neural network), where the risk metric corresponds to an authentication probability of a user of the second electronic device (e.g., an individual) and/or a second user of the electronic device (e.g., another individual); and selectively perform an additional action (such as authenticating the individual and/or the other individual during a transaction) based at least in part on the computed risk metric.

Electronic device 110-2 and electronic device 110-3 may perform counterpart operations to the aforementioned operations. Moreover, electronic device 110-2 may use the authentication techniques to authenticate the individual and/ or the other individual during the transaction. Notably, electronic device 110-2 may receive, from electronic device 110-1, information that specifies or that corresponds to the one or more distortions in measurements performed by a sensor in electronic device 110-1. Then, electronic device 110-2 may optionally determine, based at least in part on the information, the one or more distortions. Moreover, electronic device 110-2 may compare the determined one or more distortions with historical values of the one or more distortions. For example, electronic device 110-2 may have received historical information that specifies or that corresponds to the historical values of the one or more distortions from electronic device 110-3. Notably, electronic device 110-3 may be included in a community associated with or specified by the individual, and electronic device 110-2 may request and receive the historical information from electronic device 110-3, which previously received the historical information from electronic device 110-1. Alternatively or additionally, electronic device 110-3 may have communicated with electronic device 110-1 during a time interval, and may have received the historical information that specifies or that corresponds to the historical values of the one or more distortions from electronic device 110-1. Next, based at least in part on the comparison, electronic device 110-2 may selectively authenticate the individual associated with electronic device 110-1 and/or the other individual associated with electronic device 110-2.

In this way, the authentication techniques may the allow the individual and/or the other individual to be authenticated during transactions without compromising their privacy. Moreover, these authentication techniques may be performed seamless by electronic devices in a network without requiring action by the individual and/or the individual. For example, the electronic devices may exchange the necessary information during their communication, so that the authentication can be performed automatically. Furthermore, the information may be exchanged continuously, so that the authentication techniques can provide robust and secure authentication. Additionally, by not exchanging, storing or using information that, directly or indirectly, can be used to identify the individual and/or the other individual may significantly improve or eliminate risks to privacy and sensitive information during authentication.

While the preceding discussion illustrated the authentication techniques using interaction among electronic devices 110, in other embodiments at least some of the described operations are performed locally and/or remotely (e.g., using computer 112). Consequently, in some embodiments, the authentication techniques are implemented using a centralized and/or a distributed approach. For example, the authentication techniques may be implemented using a client-server architecture, such as using electronic device 110-1, electronic device 110-2 and computer 112 (which may provide the historical values of the one or more distortions instead of or in addition to electronic device 110-3). Alternatively, at least some of the operations in the authentication techniques may be performed by electronic device 110-1, such as determining the one or more distortions in a current instance of a measurement.

Figure 2:
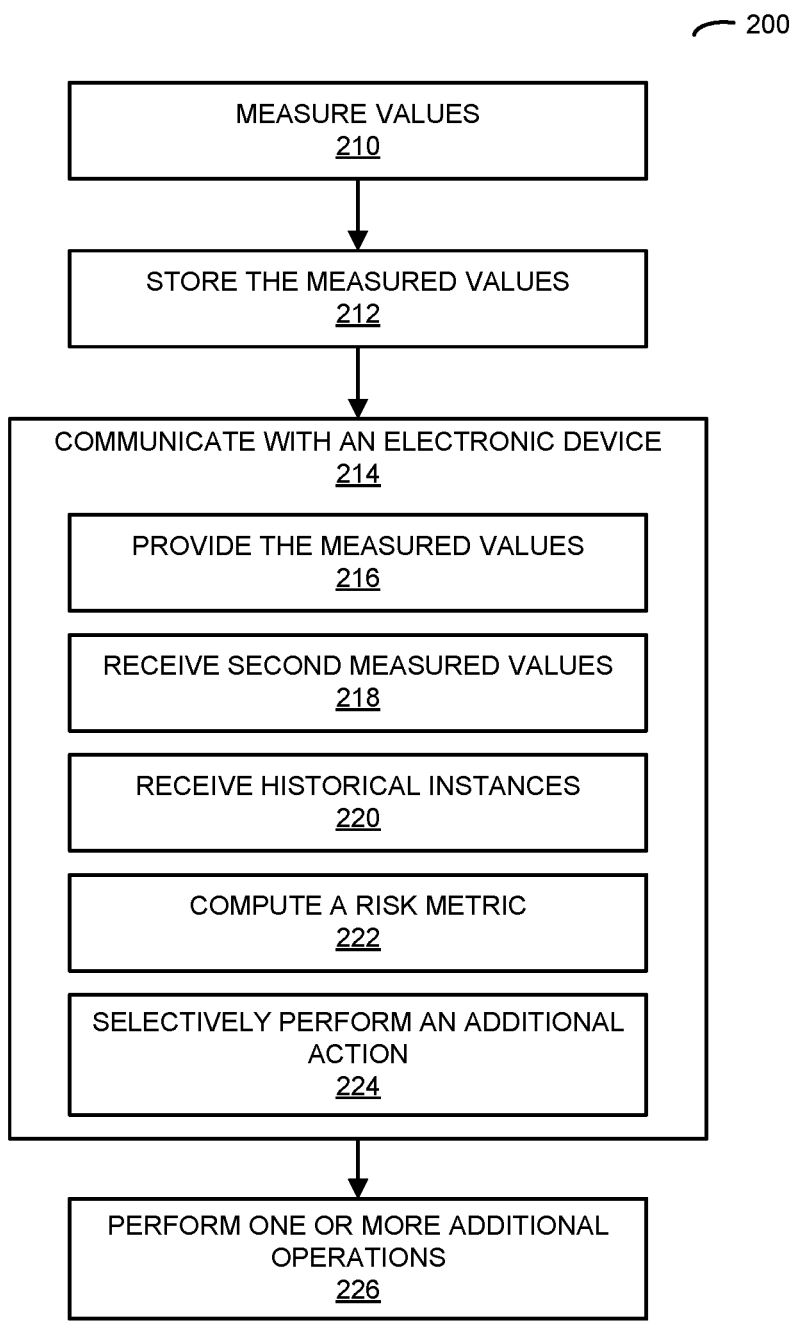
FIG. 2 is a flow diagram illustrating an example of a method for selectively authenticating an individual using an electronic device in FIG. 1 in accordance with an embodiment of the present disclosure.

We now describe embodiments of the method. FIG. 2 presents a flow diagram illustrating an example of a method 200 for selectively authenticating an individual, which may be performed by a second electronic device (such as electronic device 110-1 in FIG. 1). During operation, the second electronic device may measure (operation 210), during a time interval, values of a set of one or more attributes associated with an environment of the second electronic device and associated with a set of one or more characteristics of the set of one or more sensors, where a given characteristic in the set of one or more characteristics is associated with a given sensor in the set of one or more sensors. Then, the second electronic device may store the measured values (operation 212) in the memory.

Moreover, after measuring the values (operation 212), the second electronic device may communicate with an electronic device (operation 214). Note that the communication may include establishing a connection with the electronic device.

While performing the communication (operation 214), the second electronic device may: provide, to the electronic device (e.g., addressed to the electronic device), the measured values (operation 216); receive, associated with the electronic device (e.g., from the electronic device), second measured values (operation 218); receive, associated with at least a third electronic device (e.g., from at least the third electronic device), historical instances of the measured values and the second measured values (operation 220); compute a risk metric (operation 222) associated with a transaction based at least in part on the measured values, the second measured values and the historical instances of the measured values and the second measured values, where the risk metric corresponds to an authentication probability of a user of the second electronic device (e.g., an individual) and/or a second user of the electronic device (e.g., another individual); and selectively performs an additional action (operation 224) based at least in part on the computed risk metric.

In some embodiments, the second electronic device may optionally perform one or more additional operations (operation 226). For example, the computing may include comparing the measured values to the historical instances of the measured values associated with a set of one or more environments of the electronic device. Note that a given measured value may correspond to measurements in a given environment in the set of one or more environments.

Moreover, a given measured value may correspond to a convolution of a given stimulus in the environment and the given characteristic. Furthermore, a given measured value may correspond to a distortion associated with the given sensor. For example, the given characteristic may include: a transfer function associated with the given sensor, or noise associated with the given sensor. Note that the measuring of the values during the time interval may be non-continuous as a function of time. In some embodiments, the measured values may be integrated or averaged over the time interval.

Additionally, the second electronic device may dynamically modify the time interval based at least in part the computed risk metric. For example, when the computed risk metric indicates that the individual and/or another individual should not be authenticated, the time interval may be increased. Alternatively, when the computed risk metric indicates that the individual and/or the other individual should be authenticated, the time interval may be decreased or may be left unchanged.

Note that the set of one or more sensors may include: a microphone, an accelerometer, an image sensor, an orientation sensor, or a temperature sensor. In some embodiments, the set of one or more sensors may include a sensor having an accuracy that fails to meet a manufacturing specification for the sensor.

Moreover, the set of one or more attributes may include: a lighting condition, vibration, noise, or temperature. More generally, the set of one or more attributes may include a physical parameter or property of the second electronic device and/or a given environment.

Furthermore, the additional action may include performing an additional operation to authenticate the user and/or the second user. For example, the additional action may include providing an alert and/or discontinuing the transaction.

Note that the received historical instances of the measured values and the second measured values may be associated with a set of one or more electronic devices (such as at least the third electronic device, which may be one of the one or more third electronic devices), and the set of one or more electronic devices may include the electronic device and/or the third electronic device. For example, the historical instances of the measured values and the second measured values may have been previously received by at least the third electronic device from, respectively, the second electronic device and the electronic device.

Additionally, one or more of the measured values, the second measured values, or the historical instances of the measured values and the second measured values may be obfuscated to protect privacy of users of the second electronic device and/or the electronic device.

Figure 3:
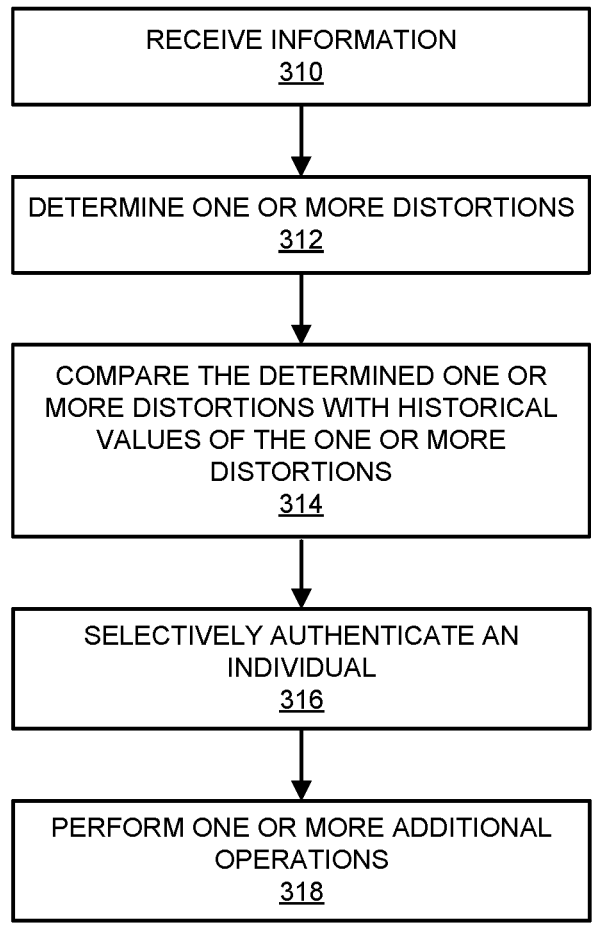
FIG. 3 is a flow diagram illustrating an example of a method for selectively authenticating an individual using an electronic device in FIG. 1 in accordance with an embodiment of the present disclosure.

FIG. 3 presents a flow diagram illustrating an example of a method 200 for selectively authenticating an individual, which may be performed by an electronic device (such as electronic device 110-2 in FIG. 1). During operation, the electronic device may receive, associated with the second electronic device (e.g., from the second electronic device), information (operation 310) that specifies or that corresponds to the one or more distortions, wherein the second electronic device comprises a sensor that performs measurements of a physical parameter and the measurements of the physical parameter performed by the sensor comprise the one or more distortions associated with the sensor.

Then, the electronic device may optionally determine, based at least in part on the information, the one or more distortions (operation 312). Moreover, the electronic device may compare (operation 314) the determined one or more distortions with historical values of the one or more distortions. Next, based at least in part on the comparison (operation 314), the electronic device selectively authenticates the individual (operation 316) associated with the second electronic device. More generally, the electronic device may perform an additional action.

In some embodiments, the electronic device may optionally perform one or more additional operations (operation 318). For example, the determining of the one or more distortions (operation 312) may include computing the one or more distortions based at least in part on the information that specifies or that corresponds to the one or more distortions. Alternatively or additionally, the information that specifies or that corresponds to the one or more distortions may include the one or more distortions.

Moreover, the comparing (operation 314) may include the electronic device receiving, associated with one or more third electronic devices (e.g., from the one or more third electronic devices), historical information that specifies or that corresponds to the historical values of the one or more distortions. For example, the one or more third electronic devices may be included in a community associated with or specified by the individual, and the electronic device may request and receive the historical information from the one or more third electronic devices, which previously received the historical information from the second electronic device. Alternatively or additionally, the one or more third electronic device may have communicated with the second electronic device during a time interval, and may have received the historical information that specifies or that corresponds to the historical values of the one or more distortions from the second electronic device. Thus, the one or more third electronic devices may be included in a network of the second electronic device and, therefore, in a social graph of the individual.

Furthermore, the comparing (operation 314) the determined one or more distortions with the historical values of the one or more distortions may include computing the historical values of the one or more distortions based at least in part on the historical information that specifies or that corresponds to the historical values of the one or more distortions. Alternatively or additionally, the historical information that specifies or that corresponds to the historical values of the one or more distortions may include the historical values of the one or more distortions.

Additionally, the information that specifies or that corresponds to the one or more distortions may not include the measurements of the physical parameter. For example, the measurements of the physical parameter may include audio and/or video captured by the second electronic device. These measurements may include information that could be used to identify the individual. Consequently, the information that specifies or that corresponds to the one or more distortions may exclude the audio and/or the video. Instead, the information that specifies or that corresponds to the one or more distortions may indicate an amount of noise, a nonlinearity, an analog distortion (which may be associated with the sensor or associated electronic used to perform a measurement in conjunction with the sensor), a deviation from a desired color temperature, and/or environmentally-dependent variation in the audio and/or the video. Therefore, in general, the information that specifies or that corresponds to the one or more distortions may exclude information that can be used, directly or indirectly, to identify the individual or that may jeopardize their privacy.

In some embodiments, the selective authentication (operation 316) may be performed without the electronic device accessing previously stored information about the one or more distortions or the measurements of the physical parameter.

Note that the physical parameter may include: sound, an image, an acceleration of the second electronic device, an orientation of the second electronic device, a location of the second electronic device (such as information associated with a Global Positioning System), a temperature, a humidity, electrical noise, and/or another type of measurement. Note that the physical parameter may be associated with an environment that includes the second electronic device.

Moreover, the one or more distortions may include: a nonlinearity, analog distortion or a moment of a noise distribution of the measurements of the physical parameter (such as a mean noise, a root-mean-square noise, a standard deviation in the measurements of the physical parameter, etc.).

Furthermore, the one or more distortions may by uniquely associated with the sensor and, thus, with the second electronic device.

Additionally, the individual may have an optional predefined association with the second electronic device. For example, the individual may have registered or defined that they are the user or the owner of the second electronic device. This registration may be stored in memory (centrally or in a distributed manner) for subsequent use in the authentication techniques. Notably, this information may be accessed after a given electronic device is authenticated.

Then, the identity of the individual may be used in an additional operation, such as a challenge that is used to confirm that the individual is currently using the second electronic device. However, in other embodiments, the identity of the individual may remain unknown and may be confirmed in the authentication techniques using the information that specifies or that corresponds to the one or more distortions, because this information reflects the environment(s) in which the individual, and thus the second electronic device, is normally or usually located. Changes in this regard, such as when another individual is using the second electronic device, may be detected using the authentication techniques.

In some embodiments, the information that specifies or that corresponds to the one or more distortions may be secure. For example, the information that specifies or that corresponds to the one or more distortions may be hashed (such as by the second electronic device) using a secure or cryptographic hash function (such as SHA-256, SHA-512 or SHA-3) that is known to the second electronic device and the electronic device (so that the secure hash can be reversed). In some embodiments, the information that specifies or that corresponds to the one or more distortions may be combined (such as using a convolution operation) with a predefined vector (such as a random or a pseudorandom number or string) and/or may be encrypted using information known to the electronic device and the second electronic device (such as the predefined vector and/or an encryption key). Thus, in some embodiments, the determining of the one or more distortions (operation 312) may include reversing the securing of the information that specifies or that corresponds to the one or more distortions.

In some embodiments of methods 200 (FIG. 2) and/or 300, there may be additional or fewer operations. Furthermore, the order of the operations may be changed, and/or two or more operations may be combined into a single operation.

Figure 4:
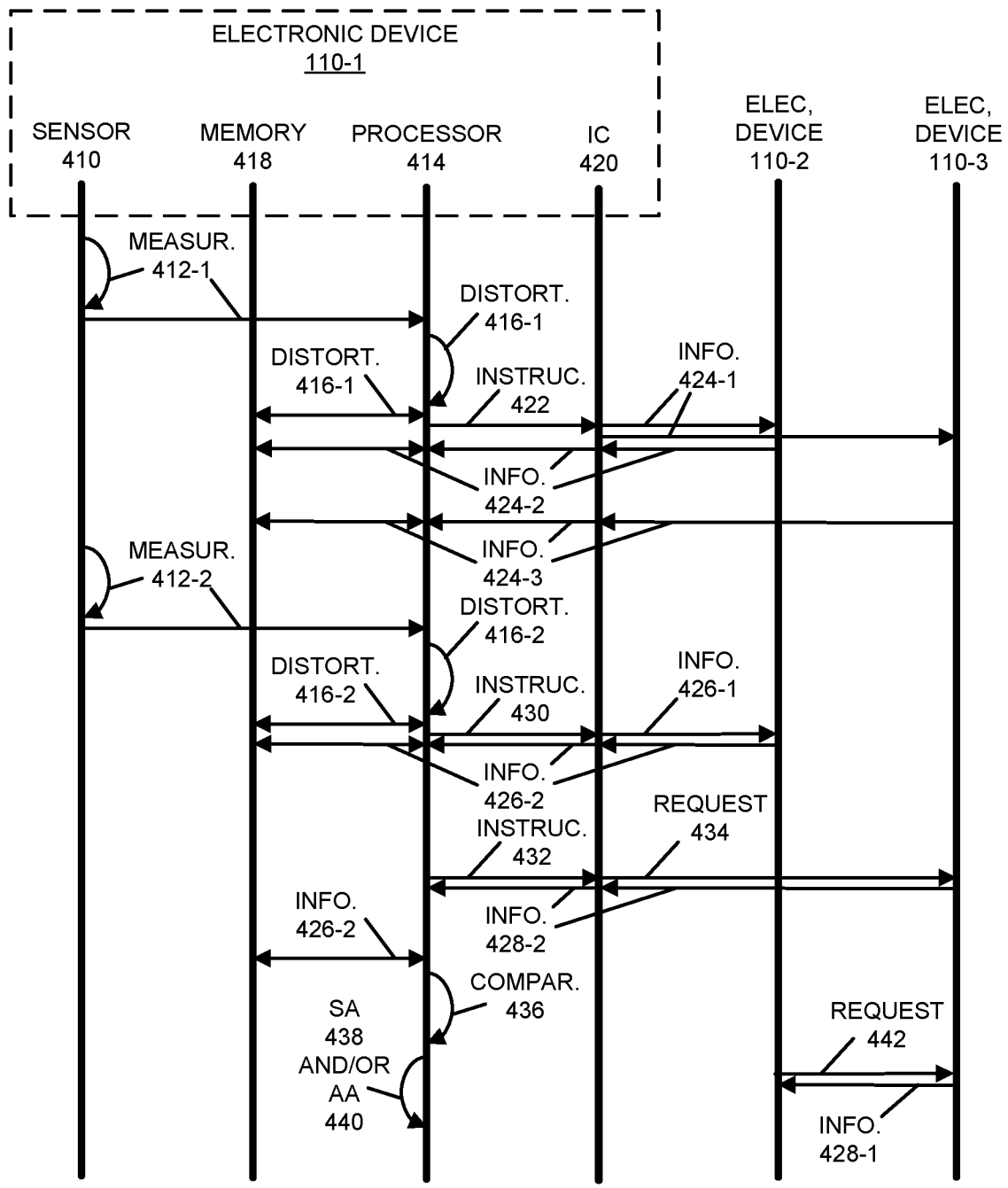
FIG. 4 is a drawing illustrating an example of communication between electronic devices in FIG. 1 in accordance with an embodiment of the present disclosure.

Embodiments of the authentication techniques are further illustrated in FIG. 4, which presents a drawing illustrating an example of communication among electronic devices 110. In FIG. 4, electronic devices 110 may perform measurements, during a time interval, using sensors in electronic devices 110, and may exchange information that specifies or that corresponds to one or more distortions in the measurements. Note that the one or more distortions may be associated with the sensors and/or environments of electronic devices 110. For example, sensor 410 in electronic device 110-1 may perform measurements 412-1 of a set of one or more attributes associated with an environment of electronic device 110-1 (such as a physical parameter of the environment). Then, processor 414 in electronic device 110-1 may analyze measurements 412-1 to determine an instance of a set of one or more characteristics of sensor 410 (such as one or more distortions 416-1), which processor 414 may store in memory 418 in electronic device 110-1. Moreover, processor 414 may instruct 422 interface circuit (IC) 420 in electronic device to communicate information 424-1 that specifies or corresponds to the instance of the set of one or more characteristics with electronic devices 110-2 and/or 110-3. Similarly, electronic devices 110-2 and/or 110-3 may perform instances of the measurements, may determine instances of the set of one or more characteristics and may provide information 424-2 and 424-3 that specifies or corresponds to the instances of the set of one or more characteristics. After receiving information 424-2 and 424-3, electronic device 110-1 may store information 424-2 and 424-3 in memory 418 along with identifiers of electronic devices 110-2 and 110-3.

Subsequently, at least a pair of electronic devices 110 may use information that specifies or corresponds to instances of the set of one or more characteristics to authenticate one or more users of the pair of electronic devices 110. For example, electronic device 110-1 may conduct a transaction with electronic device 110-2. During the transaction, electronic devices 110-1 and 110-2 may exchange information 426 that specifies or corresponds to current instances of the set of one or more characteristics. Moreover, electronic devices 110-1 and 110-2 may request and receive from electronic device 110-3 historical information 428 that specifies or that corresponds to historical values of the instances of the set of one or more characteristics, which were previously received from electronic devices 110-1 and 110-2 and stored by electronic device 110-3.

For example, processor 414 may instruct 430 interface circuit 420 to provide information 426-1 to electronic device 110-2, and electronic device 110-1 may receive information 426-2 from electronic device 110-2. Then, processor 414 may instruct 432 interface circuit 420 to request 434 from electronic device 110-3 historical information 428-2 that specifies or that corresponds to historical values of the instances of the set of one or more characteristics for electronic device 110-2. Moreover, electronic device 110-1 may receive historical information 428-2 from electronic device 110-3.

Next, processor 414 may compare 436 information 426-2 (which is accessed in memory 418) and historical information 428-2. Based at least in part on the comparison 436, processor 414 may selectively authenticate (SA) 438 an individual associated with electronic device 110-2 and/or may perform an additional action (AA) 440. For example, processor 414 may discontinue the transaction or may complete the transaction.

Similarly, electronic device 110-2 may perform counterpart operations to the aforementioned operations performed by electronic device 110-1. For example, electronic device 110-2 may provide information 426-2 to electronic device 110-1, and electronic device 110-2 may receive information 426-1 from electronic device 110-1. Then, electronic device 110-2 may request 442 from electronic device 110-3 historical information 428-1 that specifies or that corresponds to historical values of the instances of the set of one or more characteristics for electronic device 110-1. Moreover, electronic device 110-2 may receive historical information 428-1 from electronic device 110-3. Next, electronic device 110-2 may compare information 426-1 and historical information 428-1. Based at least in part on the comparison, electronic device 110-2 may selectively authenticate an individual associated with electronic device 110-1 and/or may perform an additional action. For example, electronic device 110-2 may discontinue the transaction or may complete the transaction.

Consequently, the authentication techniques may allow electronic devices 110-1 and/or 110-2 to selectively perform authentication during the transaction.

While FIG. 4 illustrates communication between components using unidirectional or bidirectional communication with lines having single arrows or double arrows, in general the communication in a given operation in this figure may involve unidirectional or bidirectional communication.

We now further describe embodiments of the authentication techniques. In some embodiments, a system uses technology to verify and authenticate a person or lifeform using a smart electronic device based at least in part on sensors in the smart electronic device (which may include any kind of sensors or a combination of these sensors, such as an imaging sensor, a touch or haptic sensor, a fingerprint sensor, a biological sensor, an accelerometer, an orientation sensor, a vibration sensor, a voice sensor, a location sensor (such as a Global Positioning System sensor), etc. The authentication techniques may use one or more of the sensors to learn about the person so the system can identify them based at least in part on their normal, learned behaviors. In order to secure the privacy of the person/lifeform, the learning program or program instructions may maintain weights and may not keep the sensed information that aids in the learning process.

The system may use many services available on a smart electronic device (such as a smartphone). However, the machine learning behind this system may only be the result of the learning process. For example, all other data may be discarded as it is being learned. In some embodiments, the learning process may be performed by tapping into the information flow without the need to be involved directly with generating any measurement.

The system may also allow the owner of the electronic device to specify when or not to respond to the question: "Are you who you say you are?"

These authentication techniques for authenticating a user may facilitate improved security techniques, including security techniques that include or are associated with: password usage, a financial institution, transaction verification, medical-related verification, session break down, etc.

Consequently, the system may be used with an arbitrary type of transaction (including a financial and/or non-financial transaction) and may verify a transaction in real time based at least in part on the user or person (as opposed to using a password). Thus, the authentication techniques may allow a session (such as while using a search engine) to be continuously authenticated, as opposed to being authenticated once at the beginning of the session. Stated differently, the authentication techniques may allow the system to be authenticate continuously during the session.

At a high-level, this system may provide a non-fungible and physical identity having a one-to-one association with a person or a lifeform. This can be used to identify calls and any transaction over a network (e.g., the Internet) at the discretion of a user. In some embodiments, no information or data may be taken from the user's mobile electronic device. Instead, the system may securely communicate the yes/no answer to the question: "Are you who you say you are?" The system may allow the user to choose who they share their identity with, e.g., over cloud services, from their computer or from any of their mobile or smart electronic devices. Therefore, the system may provide enhanced digital security, such as an intelligent assistant that works with you to protect and control your privacy.

In addition, the system may provide users (and/or those asking to authenticate users) an associated confidence level. This confidence level may range from, e.g., 0-99% and may be a dynamic number that is based at least in part on usage by a user in real time. Consequently, the authentication may be performed according to a spectrum (e.g., a percentage exceeding a threshold, such as 80, 90 or 95%, may result in certain permissions being enabled). Moreover, the confidence level may change based on the behaviors of the user and may provide the confidence level to whomever is asking for the authentication information. Based at least in part on this confidence level, the authenticator may either authenticate the user or not.

Figure 5:
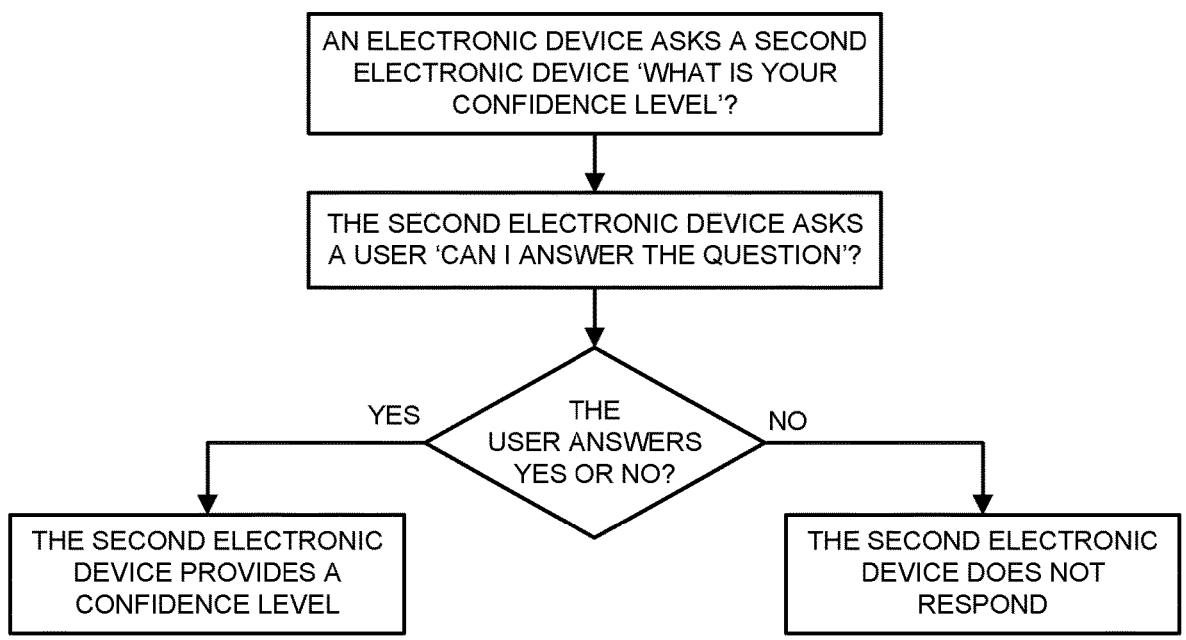
FIG. 5 is a drawing illustrating an example of selective authentication of an individual in accordance with an embodiment of the present disclosure.
Figure 6:
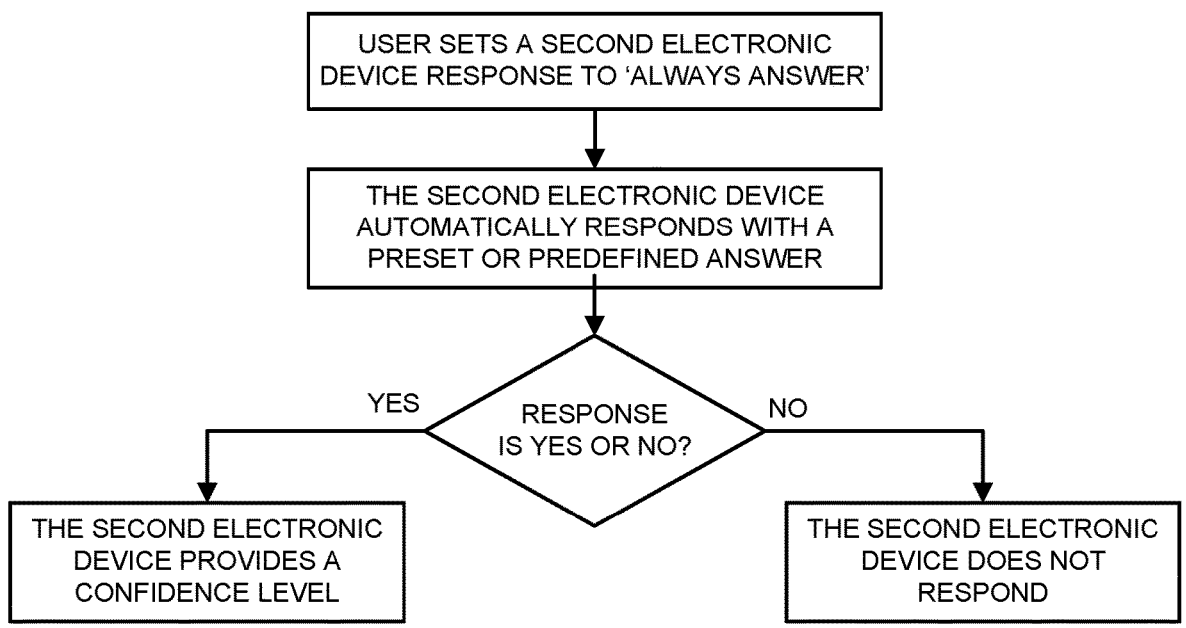
FIG. 6 is a drawing illustrating an example of selective authentication of an individual in accordance with an embodiment of the present disclosure.

FIG. 5 presents a drawing illustrating an example of selective authentication of an individual using a call flow. Moreover, FIG. 6 presents a drawing illustrating an example of selective authentication of an individual using a call flow with a preset response.

In some embodiments, the authentication techniques may provide authentication using artificial intelligence (e.g., a pretrained neural network) and/or machine learning (such as a pretrained classifier based at least in part on a supervised or an unsupervised machine-learning technique). In some embodiments, weights associated with pretrained predictive model may be encrypted and stored on a given electronic device and may only be used to identify the person/user of this electronic device. Anyone else may fail the verification. Note that the system may train a machine-learning technique to recognize the user in concert with the use of one or more sensors incorporated into a smart electronic device. Moreover, the system may perform continuous learning and, thus, may be able to detect a change in a user in real time (e.g., on a timescale of the runtime or execution of software or program instructions by a given electronic device). Furthermore, the one or more sensors may include: an imaging sensor, a touch sensor, a fingerprint sensor, a biological sensor, an accelerometer, an orientation sensor, a voice sensor, a location sensor, etc.

Note that the authentication may not require or may not involve cloud-based authentication (so that there is reduced or no privacy risk). Instead, the authentication may be performed by electronic devices in a network. Moreover, user-specific data or data that can be used to identify a user may not be exported or shared from the user's electronic device. Thus, no data or information about the user may be stored or used in the authentication techniques. Consequently, the authentication techniques may be 'user data free.'

In some embodiments, the authentication techniques may provide authentication/verification for one or more types of transactions, including: during communication (e.g., texting, phone calls, etc.); a financial transaction (such as banking or a credit-card transaction, e.g., authentication of an online credit or debit-card transaction); a medical-related transaction; and/or another type of transaction (e.g., any packet or packet-based transaction). Note that the authentication techniques may enable electronic signatures on any and/or all transaction, which may be signed in context by the user without their direct involvement.

Furthermore, the smart electronic device may be an arbitrary smart electronic device, such as: a pen that identifies its owner; a camera that identifies a person in front of it; a cellular telephone; a computer; a wearable electronic device (such as a watch); etc.

Additionally, transactions may be authenticated per session or per element/event in a session. For example, when a user walks away from an electronic device that is controlling or is involved in a session (such as computer terminal), the session may be automatically ended by the system in order to maintain authentication. Thus, the system may maintain authentication throughout a session and may have the ability to control a session in order to maintain this uninterrupted authentication.

In some embodiments, the authentication techniques may provide identity solutions without maintaining or storing any private information of or associated with an individual. The system may adapt itself to a user/lifeform's normal behavior and may use these environmental, biological, physical, emotional and/or behavioral inputs to dynamically train itself to authenticate a person/lifeform in real time and continuously without maintaining a memory of the events that trigger the learning process anywhere in the smart electronic device and/or in the cloud.

Note that there are many types of sensors, including: vision and imaging sensors, temperature sensors, radiation sensors, proximity sensors, position sensors, photoelectric sensors, particle sensors, motion sensors, humidity sensors, chemical sensors, electric-field sensors, electromagnetic-field sensors, contact sensors, non-contact sensors, geolocation sensors, accelerometers, gyroscopes, biological sensors, etc. Vision and image sensors sense light, color and hues within a field of view; temperature sensors detect thermal parameters; radiation sensors detect the presence of alpha, beta, or gamma particles; proximity sensors detect the presence of nearby objects through non-contacting means; position sensors detect the position of an object; photoelectric sensors sense objects passing within their field of detection as well as detecting color and location; particle sensors sense dust and other airborne particles; motion sensors sense movement or lack of movement of objects in the field of view; humidity sensors detect the absolute or relative amount of water vapor in the air; chemical sensors can detect the presence of particular chemicals; contact sensors can detect physical contact between the sensor and an object; non-contact sensors do not require physical contact but can detect proximity of an object using passive infrared energy, microwave energy, light, ultrasonic waves, etc.; accelerometers measure acceleration; gyroscopes measure orientation and angular velocity; a real-time location system (RTLS) tracks the location of objects; and an electromagnetic sensor measures the intensity of light and, more generally, an electromagnetic field.

In general, sensors are designed and desired to accurately (as possible) provide measurements that are repeatable. When a sensor repeats its measurements, it should provide the same or similar results given the same input. The sensor may also be designed so that, when the same sensor type and functionality is provided by different manufacturers or by different manufacturing processes, it will provide similar values when independently measuring the same input. Typically, in order for a sensor to meet the desired criteria of repeatability, the sensor may be calibrated to eliminate the effects of random manufacturing processes and other hardware variations.

As described above, there are many sensor types that may be of interest. However, these sensors have inherent uniqueness in their distortions (such as nonlinearities and/or noise). For example, accelerometer noise can be broken down into the electric noise from the circuitry responsible for converting motion into a voltage signal and the mechanical noise from the sensor itself. The electric noise comes from sources such as shot noise, flicker noise and so on, while the mechanical noise comes from Brownian (thermo-mechanical) noise and environmental vibration noise.

Note that distortion may refer to any change in a waveform of a signal and, in some cases, the introduction of new frequencies. In general, analog distortion occurs across all types of sensors, e.g., CMOS or digital, analog, audio, etc. For example, analog switches are a common prerequisite for many electronics system inputs and outputs. CMOS switches can significantly distort the input signal in some applications. The basic switch architecture allows for positive and negative voltages to be passed or conveyed, but may also cause the overall resistance of the switch to change with the input signal. One way of reducing or correcting the voltages is accomplished by enclosing the switch inside the feedback loop of an amplifier.

As noted previously, sensor calibration is sometimes used to ensure precision and reproducibility of sensors or measurement instruments. The different types of sensor calibration are dependent on the type of sensors being calibrated or recalibrated. At a high-level, there are three main types of sensor calibration; one point, two point, and multi-point curve fitting. One point calibration uses only one measurement point and can be used to correct sensor offset errors. Two-point calibration can be applied to either raw or scaled sensor outputs, and the process rescales the output and can correct both the slope and offset errors. This type of calibration is often used in cases where the sensor output is known to be linear over the measurement range. Multi-point curve fitting is for sensors that are nonlinear over the measurement range and require some curve fitting to achieve accurate measurements over the measurement range.

In the present discussion, we use the following definitions. A 'non-fungible device' (NFD) includes non-fungible hardware (which can be biological, chemical, electromagnetic or any other combination, such that it constitutes non-fungible hardware). The non-fungible criterion may be met by using a group of sensors that include inherent randomness (e.g., due to manufacturing process, and/or intentional design) in the process of creating the electronic device. Once it was manufactured, this aspect of a given electronic device cannot be changed or copied. The electronic device and sensors included may be semi-stable, e.g., they can shift their reading over time without any outside catalyst, but more due to their makeup than an external influence. In practice, the electronic device can be and is not limited to: a handheld device, such as cellular-telephone, a tablet, a computer, a wearable device (such as a watch or ring), or another type of device. The electronic device may actively and/or passively communicate or convey information (which may be analog and/or digital).

A 'sensor' can be and is not limited to a sensor specific to a function, such as a sensor for sensing: humidity, temperature, ambient light, ultrasonic waves, biometrics, DNA, etc. A sensor can be highly tuned or intentionally untuned to deliver distorted and rough measurements that can only be repeated by itself and no other sensor because of its manufacturing process.

An 'entity' (E) may be a logical, physical, biological or a combination that is represented by one or more NFDs. It can be a data structure, a software module and/or hardware that represents or conveys some information.

A 'transact' (Tr) may include the act of communicating information associated with a transaction, and can be and is not limited to a telephone call, a text message, a financial transaction, etc. It is a type of interaction between two different electronic devices or two objects.

A 'delta time' (DT) may be a defined time period or time interval.

A 'neural network' may include a recurrent (RNN), a convolutional network (CNN), a deep convolutional network (DNC), or another type of neural network, and may not be limited to one kind. In the authentication techniques, the NN may represent the concept of a technique that takes as input a plurality of sensor data and generates an output (such as a confidence level or measurement code) that is some function of the input data. More generally, the NN can be any other type of mathematical technique (such as a supervised-learning technique, a hash function, an encoding function, etc.) that delivers the same code using a linear or a nonlinear process. A NN represents a statistical model that delivers a code or a set of numerical or alphanumerical values that represents the sensor input blended over a DT.

A 'current code' (CC) may be a measurement code generated by the NN. Data from the sensor(s) are input to the NN, which generates a unique code. The CC is a code that represents the normal baseline environment of the NFD. It is unique to the input that is experienced only by this NFD and because of the inherent distortion of the measurements provided by the sensors used in the process. This code can be generated continuously, non-continuously or based at least in part on specific triggers (such as needed).

As discussed further below with reference to FIG. 7, a 'baseline code' (BC) may be a CC that is maintained or remembered for a specific period of time as an average code that represents the list of CCs (e.g., for different environments) that have been experienced in the past DT.

In some embodiments, the authentication techniques are used to authenticate transactions between electronic devices using unique distortions, randomness (or lack of synchronization) in sensors that occur during the manufacturing process. Moreover, in some embodiments, a level of coarseness in the manufacturing process may be used to promote blended or distorted and per-sensor-unique behavior that is influenced by the immediate environment of a sensor.

Unique sensor randomness may occur as a result of the manufacturing process and/or may be impacted by environmental influences. These environmental influences are often construed as background noise that is not attuned to any specific, decipherable information, yet represent unique context and are fully bound to the sensor hardware, such that they cannot be replicated by other sensors of the same type. This undecipherable stream of data is specific to the sensor (s) and can occur in different sensor types and may ultimately be used to create a unique identity for a sensor and its associated electronic device that includes the hardware. In the discussion that follows, normal sensor distortion and randomness (such as noise), including intrinsic distortion and/or environmentally dependent distortion, is used in NFD-based electronic devices.

The integrated sensors within the NFD output data that may be put through a technique that generates a unique encrypted code. The NN may be responsible for creating both the BC and the CC. The CC may change over time based at least in part on current environment conditions that are changing over time and that are monitored by the sensor(s), which in turn leads to the NN to generate new codes based at least in part on the changes in the environment.

Within a given time-window DT, an E may be present in a limited set of environments. When moving between different environments, the CC measurement may be changed by a delta relative to the average baseline BC. The NN may average and smooth the curves so that, within a given DT, a normal average environment may be measured. Any measurement within this average environment may result in a CC that is close or similar to the BC. While the CC and the BC are evolving and may be frequently updated based at least in part on authenticated inputs from the environment and the users, the current BC may serve as the baseline used for transaction-request authentications.

When one entity is successfully transacting with another entity, both will remember the BC of each other and may keep or maintain it (e.g., in memory) for at least DT time period. For example, the BC may be encrypted or hashed and stored in memory.

The averaged environment of multiple environments of an electronic device is shown below in FIG. 7. Notably, FIG. 7 presents a drawing illustrating an example of a blended BC.

Figure 7:
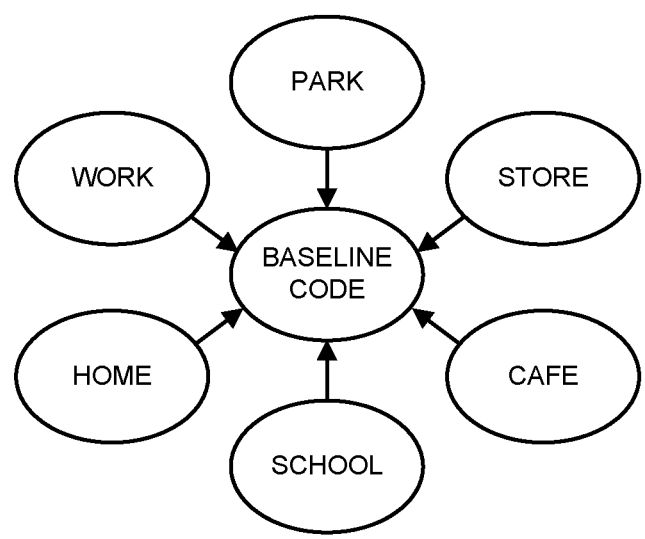
FIG. 7 is a drawing illustrating an example of a blended baseline code in accordance with an embodiment of the present disclosure.

As depicted in FIG. 7, on the average in some time, Δt or DT, an electronic device of a user or entity U (Eu) may experience or may be exposed to all of the environments (home, work, cafe, etc.). These environments can be represented by a single string of data in the center that is a mathematical formula or expression corresponding to the individual currents/baselines in an environment. The experience of the sensors within that environment over time, Δt or DT, may provide a blended BC. This combination of environments is a super environment that represents the life of the electronic device of Eu. Therefore, if within the time, Δt, or DT, we take the electronic device of Eu into a different environment outside of our superset, the experience and output code will be far off resulting in an unauthenticated entity.

When one entity is successfully transacting with another entity, both will remember (e.g., store in memory) the BC of each other. They remember the BC for a period of time and every time they transact, they remember the BC.

We now summarize embodiments of a transaction authentication process. In general, the authentication techniques use a system that retains information that does not expose the Es' identity, only the fact that these Es exist and that a transaction took place at some given time. As discussed previously, the Es retain the BC for all other Es that have been transacted within a given period of time, DT (which does not need to be fixed or static for any of the participants in this technique). For example, DT may be 1, 3, 6 or 12 hours or one or more days. Using the BC and a given CC, a given E can calculate an authentication score (AS). The AS may be calculated by the Es by comparing the CC and the stored BCs during a voting process among two or more electronic devices for a given E that requires authentication. Then, the Es may exchange the AS values. The average AS may be compared to a threshold that results in an authenticated or unauthenticated transaction from that examined E (e.g., a score of >95% results in a positive authentication, whereas a score of <95% results in a negative authentication). The match between the BC and CC mat be within a set boundary for an authentication approval/positive score. The authentication score can be generated by $$f(x) = \frac{\text{Current Code}}{\text{Baseline Code}}.$$

However, in general, other techniques or functions may be used to answer the question: How far is the CC from the BC?

Figure 8:
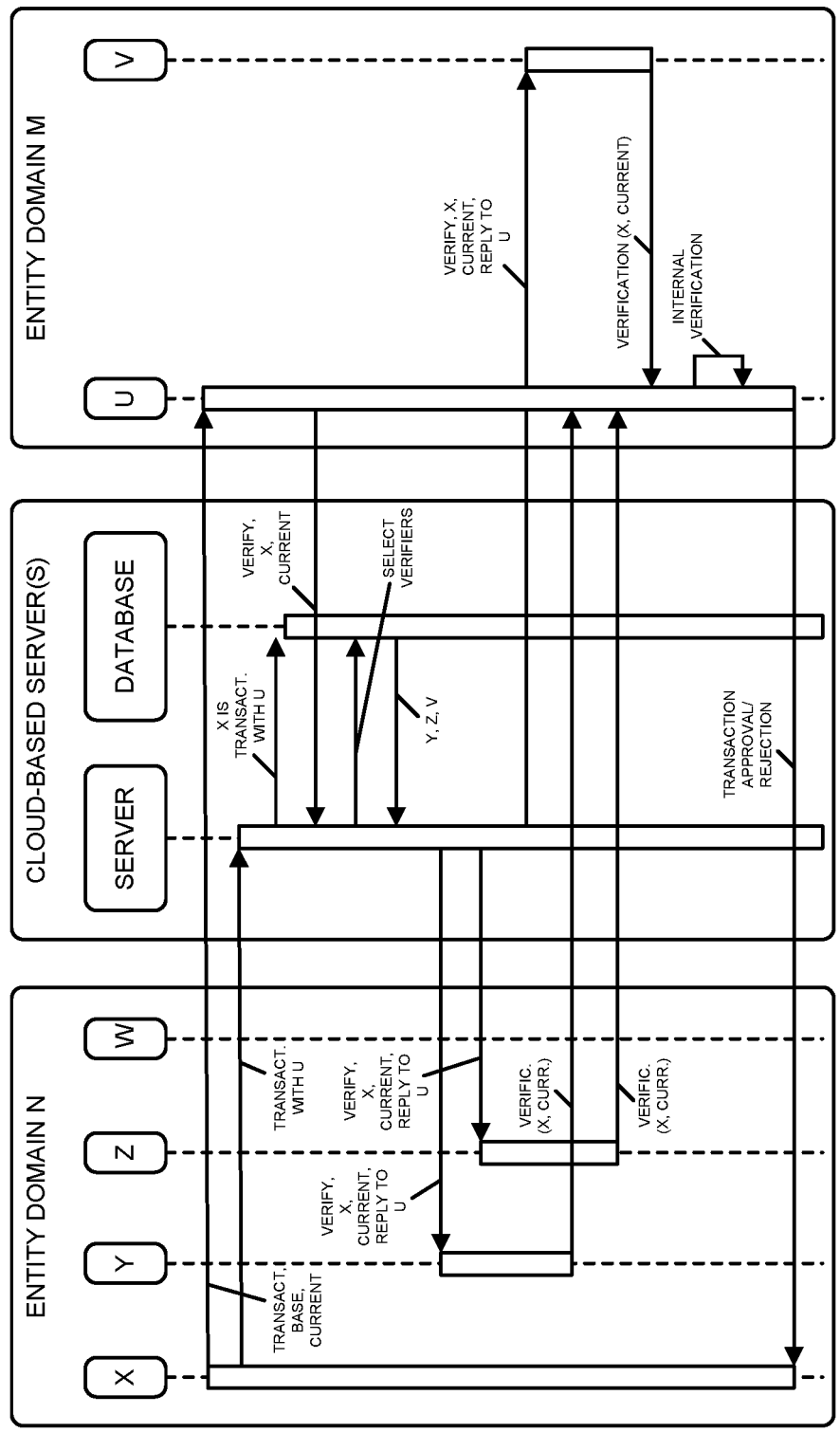
FIG. 8 is a drawing illustrating an example of a transaction between entities in accordance with an embodiment of the present disclosure.

The voting process is described in FIG. 8. Notably, FIG. 8 presents a drawing illustrating an example of a transaction between entities, such as entity X and entity U, including an associated call flow. In FIG. 8, X is the first entity that is sending a transaction to a second entity, U. Entity U may trust X without further verification. Alternatively, U can ask a cloud-based computer (such as computer 112 in FIG. 1) or another electronic device for further authentication of X before completing or continuing the transaction.

Entity X may request to transact with entity U and may send a transact request, BC, and CC. Entity X may also share the transaction with the cloud-based computer (or another electronic device), and the cloud-based computer may share the data structure that entity X is requesting to transact with entity U. Entity U may send a verify request, with information specifying entity X and CC, to the cloud-based computer or server. In order to verify the entity X, the server may select a number of verifiers (verifiers Y, Z, and V). This is a form of crowdsourcing (or group authentication) of the verification. The selection of verifiers by the server may use a random or pseudorandom selection from multiple entities. Alternatively, the selection may be based at least in part on an accuracy of the authentication that occurred with one or more previous instances of the selected verifiers. The server may send verification requests to each of the verifiers and may include information specifying entity X, the CC, and a reply to entity U. Without providing these entities any baseline (or BC), each verifier may compare the entity's CC with their stored BC for this entity. Then, the verification of entity X and the CC may be sent directly to entity U by a given verifier (or, in other embodiments, via the server). This is the voting process. Next, entity U may perform an internal verification (such as comparing the AS values or the average AS value to a threshold) and then the transaction is either approved or rejected.

In these authentication techniques, the verification of entity X and CC may be sent as encrypted messages that only entity U can decrypt and a given transaction may be secure end-to-end. In some embodiments, encryption keys are preinstalled on the electronic devices of the entities (or users), e.g., when the users download and install a transaction-authentication application on their electronic devices.

Figure 9:
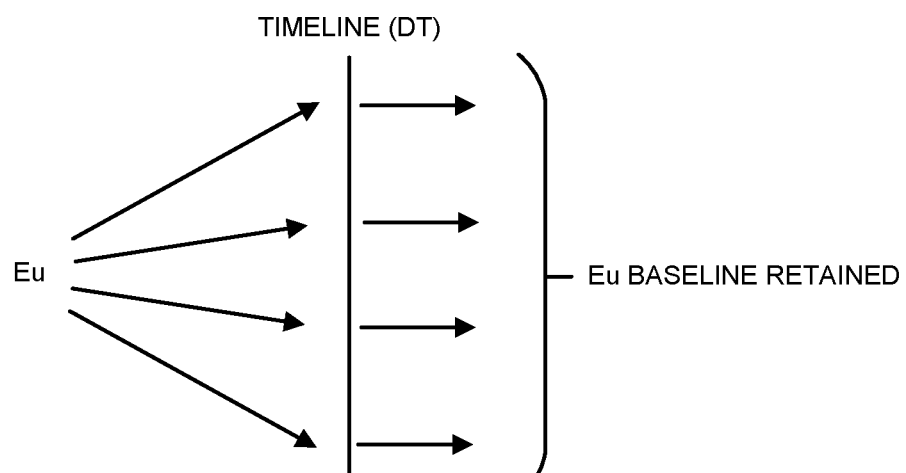
FIG. 9 is a drawing illustrating an example of a timeline of entity baseline codes in accordance with an embodiment of the present disclosure.

FIG. 9 presents a drawing illustrating an example of a timeline of entity BCs. Notably, FIG. 9 depicts an example in which Entity U (Eu) and Entity V (Ev) are transacting once per day. Eu can choose to keep a new baseline every hour, every few days, or as often desired (DT or Δt). Eu may choose the oldest BC within a time window when comparing to a CC and Eu as an entity may be circulating in the same or through the same environments (on the average). Because an entity gets a BC and a CC with every transaction, the entity can remember or store in memory BCs up to DT/Δt, so that there is something to use in comparisons or authentication instances.

In some embodiments, an instance of the BC and/or the CC of a given electronic device may be intentional and reproducibly obfuscated before being shared with other electronic devices during the authentication techniques. For example, the instance of the BC and/or the CC a given electronic device may be hashed using a secure hash function that is unique to the given electronic device. Alternatively or additionally, the instance of the BC and/or the CC of the given electronic device may be reproducibly scrambled (e.g., using a shift-register sequence), may be convoluted with a predefined sequence of values or a predefined vector, or another obfuscation technique (such as an encryption technique). This obfuscation may ensure that the privacy of the users or entities is protected, while ensuring that the instance of the BC and/or CC unique is associated with the given electronic device and, therefore, which still allows the authentication techniques to authenticate a given user or entity.

In some embodiments, the authentication techniques allow sub-par sensors to be used, such as sensors that do not have sufficient accuracy to meet manufacturing specification. For example, the accuracy of a sensor may be greater than 5, 10 or 20%, while a specification may normally require an accuracy of less than 5%. This capability may reduce the cost of the electronic device used to implement the authentication techniques. In some embodiments, the sensors used in the authentication techniques are not calibrated.

As discussed previously, in some embodiments the electronic device and/or the second electronic device in the authentication techniques may use a predictive model that is pretrained or predetermined using a machine-learning technique (such as a supervised learning technique, an unsupervised learning technique and/or a neural network) and a training dataset with historical values of the one or more distortions to perform the selective authentication. For example, the predictive model may include a classifier or a regression model that was trained using: a support vector machine technique, a classification and regression tree technique, logistic regression, LASSO, linear regression, a neural network technique (such as a convolutional neural network technique, a generative adversarial network or another type of neural network technique) and/or another linear or nonlinear supervised-learning technique. During operation, the predictive model may use the information and the historical information as inputs, and may output one or more recommendations, such as whether or not to authenticate the individual.

We now describe embodiments of an electronic device, which may perform at least some of the operations in the authentication techniques. FIG. 10 presents a block diagram illustrating an example of an electronic device 1000 in accordance with some embodiments. For example, electronic device may include: one of electronic devices 110, computer 112, access point 116-1, or radio node 118. This electronic device may include processing subsystem 1010, memory subsystem 1012, and networking subsystem 1014. Processing subsystem 1010 includes one or more devices configured to perform computational operations. For example, processing subsystem 1010 can include one or more microprocessors, ASICs, microcontrollers, programmable-logic devices, GPUs and/or one or more digital signal processors (DSPs). Note that a given component in processing subsystem 1010 is sometimes referred to as a 'computational device.'

Memory subsystem 1012 includes one or more devices for storing data and/or instructions for processing subsystem 1010 and networking subsystem 1014. For example, memory subsystem 1012 can include dynamic random access memory (DRAM), static random access memory (SRAM), and/or other types of memory. In some embodiments, instructions for processing subsystem 1010 in memory subsystem 1012 include: program instructions or sets of instructions (such as program instructions 1022 or operating system 1024), which may be executed by processing subsystem 1010. Note that the one or more computer programs or program instructions may constitute a computer-program mechanism. Moreover, instructions in the various program instructions in memory subsystem 1012 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1010.

In addition, memory subsystem 1012 can include mechanisms for controlling access to the memory. In some embodiments, memory subsystem 1012 includes a memory hierarchy that includes one or more caches coupled to a memory in electronic device 1000. In some of these embodiments, one or more of the caches is located in processing subsystem 1010.

In some embodiments, memory subsystem 1012 is coupled to one or more high-capacity mass-storage devices (not shown). For example, memory subsystem 1012 can be coupled to a magnetic or optical drive, a solid-state drive, or another type of mass-storage device. In these embodiments, memory subsystem 1012 can be used by electronic device 1000 as fast-access storage for often-used data, while the mass-storage device is used to store less frequently used data.

Networking subsystem 1014 includes one or more devices configured to couple to and communicate on a wired and/or wireless network (i.e., to perform network operations), including: control logic 1016, an interface circuit 1018 and one or more antennas 1020 (or antenna elements). While FIG. 10 includes one or more antennas 1020, in some embodiments electronic device 1000 includes one or more nodes, such as antenna nodes 1008, e.g., a metal pad or a connector, which can be coupled to the one or more antennas 1020, or nodes 1006, which can be coupled to a wired or optical connection or link. Thus, electronic device 1000 may or may not include the one or more antennas 1020. Note that the one or more nodes 1006 and/or antenna nodes 1008 may constitute input(s) to and/or output(s) from electronic device 1000. For example, networking subsystem 1014 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 1014 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1000 may use the mechanisms in networking subsystem 1014 for performing simple wireless communication between the electronic devices, e.g., transmitting advertising or beacon frames and/or scanning for advertising frames transmitted by other electronic devices as described previously.

Within electronic device 1000, processing subsystem 1010, memory subsystem 1012, and networking subsystem 1014 are coupled together using bus 1028. Bus 1028 may include an electrical, optical, and/or electro-optical connection that the subsystems can use to communicate commands and data among one another. Although only one bus 1028 is shown for clarity, different embodiments can include a different number or configuration of electrical, optical, and/or electro-optical connections among the subsystems.

In some embodiments, electronic device 1000 includes a display subsystem 1026 for displaying information on a display, which may include a display driver and the display, such as a liquid-crystal display, a multi-touch touchscreen, etc.

Moreover, electronic device 1000 may include a user-interface subsystem 1030, such as: a mouse, a keyboard, a trackpad, a stylus, a voice-recognition interface, and/or another human-machine interface. In some embodiments, user-interface subsystem 1030 may include or may interact with a touch-sensitive display in display subsystem 1026.

Electronic device 1000 can be (or can be included in) any electronic device with at least one network interface. For example, electronic device 1000 can be (or can be included in): a desktop computer, a laptop computer, a subnotebook/netbook, a server, a tablet computer, a smartphone, a cellular telephone, a smartwatch, a smart pen, a consumer-electronic device, a portable computing device, a wearable electronic device, an access point, a transceiver, a radio node, a router, a switch, communication equipment, a controller, test equipment, and/or another electronic device.

Although specific components are used to describe electronic device 1000, in alternative embodiments, different components and/or subsystems may be present in electronic device 1000. For example, electronic device 1000 may include one or more additional processing subsystems, memory subsystems, networking subsystems, and/or display subsystems. Additionally, one or more of the subsystems may not be present in electronic device 1000. Moreover, in some embodiments, electronic device 1000 may include one or more additional subsystems that are not shown in FIG. 10. Also, although separate subsystems are shown in FIG. 10, in some embodiments some or all of a given subsystem or component can be integrated into one or more of the other subsystems or component(s) in electronic device 1000. For example, in some embodiments program instructions 1022 are included in operating system 1024 and/or control logic 1016 is included in interface circuit 1018.

Moreover, the circuits and components in electronic device 1000 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1014 and/or electronic device 1000. The integrated circuit may include hardware and/or software mechanisms that are used for transmitting wireless signals from electronic device 1000 and receiving signals at electronic device 1000 from other electronic devices. Aside from the mechanisms herein described, radios are generally known in the art and hence are not described in detail. In general, networking subsystem 1014 and/or the integrated circuit can include any number of radios. Note that the radios in multiple-radio embodiments function in a similar way to the described single-radio embodiments.

In some embodiments, networking subsystem 1014 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein includes receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet, a cellular-telephone communication protocol (such as LTE) and/or a Wi-Fi communication protocol as an illustrative example, in other embodiments a wide variety of communication protocols and, more generally, wireless communication techniques may be used. For example, the communication protocol in a WLAN may use OFDMA. Thus, the authentication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the authentication techniques may be implemented using program instructions 1022, operating system 1024 (such as a driver for interface circuit 1018) or in firmware in interface circuit 1018. Thus, the authentication techniques may be implemented at runtime of program instructions 1022. Alternatively or additionally, at least some of the operations in the authentication techniques may be implemented in a physical layer, such as hardware in interface circuit 1018.

In the preceding description, we refer to 'some embodiments.' Note that 'some embodiments' describes a subset of all of the possible embodiments, but does not always specify the same subset of embodiments. Moreover, note that the numerical values provided are intended as illustrations of the authentication techniques. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an interface circuit configured to communicate with a second electronic device that comprises a sensor that performs measurements of a physical parameter, wherein the measurements of the physical parameter performed by the sensor comprise one or more distortions associated with the sensor, wherein the one or more distortions of the sensor comprise semi-stable, time variation of the one or more distortions of the sensor are associated with an internal makeup of the sensor, and the one or more distortions of the sensor vary among different instances of the sensor, wherein the measurements of the physical parameter further comprise one or more environmentally dependent distortions associated with a set of environments, and wherein the sensor has an accuracy exceeding a manufacturer specification associated with the electronic device;

a computation device coupled to the interface circuit; and memory, coupled to the computation device, configured to store program instructions, wherein, when executed by the computation device, the program instructions cause the electronic device to perform operations comprising:

receiving, from the second electronic device, information that specifies or that corresponds to the one or more distortions of the sensor and the one or more environmentally dependent distortions associated with the set of environments;

determining, based at least in part on the information, the one or more distortions of the sensor and the one or more environmentally dependent distortions associated with the set of environments;

comparing the determined one or more distortions of the sensor with historical values of the one or more distortions of the sensor and the one or more environmentally dependent distortions associated with the set of environments with historical values of the one or more environmentally dependent distortions associated with the set of environments; and selectively authenticating the individual associated with the second electronic device based at least in part on the comparisons, wherein, during a given time interval, the selective authentication is denied when the second electronic device is located in a second environment that is not included in the set of environments.

2. The electronic device of claim 1, wherein the determining of the one or more distortions of the sensor comprises computing the one or more distortions of the sensor based at least in part on the information that specifies or that corresponds to the one or more distortions of the sensor.

3. The electronic device of claim 1, wherein the information that specifies or that corresponds to the one or more distortions of the sensor comprises the one or more distortions of the sensor.

4. The electronic device of claim 1, wherein the comparing comprises the electronic device receiving, from one or more third electronic devices, historical information that specifies or that corresponds to the historical values of the one or more distortions of the sensor.

5. The electronic device of claim 4, wherein the one or more third electronic devices comprise a community associated with or specified by the individual.

6. The electronic device of claim 4, wherein the one or more third electronic device communicated with the second electronic device during a time interval, and received the historical information that specifies or that corresponds to the historical values of the one or more distortions of the sensor from the second electronic device.

7. The electronic device of claim 4, wherein the comparing the determined one or more distortions of the sensor with the historical values of the one or more distortions of the sensor comprises computing the historical values of the one or more distortions of the sensor based at least in part on the historical information that specifies or that corresponds to the historical values of the one or more distortions of the sensor.

8. The electronic device of claim 4, wherein the historical information that specifies or that corresponds to the historical values of the one or more distortions of the sensor comprises the historical values of the one or more distortions of the sensor.

9. The electronic device of claim 1, wherein the information that specifies or that corresponds to the one or more distortions of the sensor does not comprise the measurements of the physical parameter.

10. The electronic device of claim 1, wherein the selective authentication is performed without the electronic device accessing previously stored information about the one or more distortions of the sensor or the measurements of the physical parameter.

11. The electronic device of claim 1, wherein the physical parameter comprises: sound, an image, an acceleration of the second electronic device, an orientation of the second electronic device, a location of the second electronic device, a temperature, a humidity, electrical noise, or another type of measurement.

12. The electronic device of claim 1, wherein the one or more distortions of the sensor comprise: a nonlinearity, analog distortion or a moment of a noise distribution of the measurements of the physical parameter.

13. The electronic device of claim 1, wherein the one or more distortions of the sensor are uniquely associated with the sensor.

14. The electronic device of claim 1, wherein the individual has a predefined association with the second electronic device.

15. The electronic device of claim 1, wherein the information that specifies or that corresponds to the one or more distortions of the sensor is secure;

wherein the security is associated with one or more of: a secure hash function, a predefined vector, or an encryption technique; and wherein the determining of the one or more distortions of the sensor comprises reversing the securing of the information that specifies or that corresponds to the one or more distortions of the sensor.

16. A non-transitory computer-readable storage medium for use in conjunction with an electronic device, the computer-readable storage medium configured to store program instructions that, when executed by the electronic device, causes the electronic device to perform operations comprising:

receiving, from a second electronic device, information that specifies or that corresponds to one or more distortions of a sensor and one or more environmentally dependent distortions associated with a set of environments, wherein the second electronic device comprises the sensor that performs measurements of a physical parameter and the measurements of the physical parameter performed by the sensor comprise the one or more distortions associated with the sensor, wherein the one or more distortions of the sensor comprise semi-stable, time variation of the one or more distortions of the sensor are associated with an internal makeup of the sensor, and the one or more distortions of the sensor vary among different instances of the sensor, wherein the measurements of the physical parameter further comprise one or more the environmentally dependent distortions associated with the set of environments, and wherein the sensor has an accuracy exceeding a manufacturer specification associated with the electronic device;

determining, based at least in part on the information, the one or more distortions of the sensor and the one or more environmentally dependent distortions associated with the set of environments;

comparing the determined one or more distortions of the sensor with historical values of the one or more distortions of the sensor and the one or more environmentally dependent distortions associated with the set of environments with historical values of the one or more environmentally dependent distortions associated with the set of environments; and selectively authenticating an individual associated with the second electronic device based at least in part on the comparisons, wherein, during a given time interval, the selective authentication is denied when the second electronic device is located in a second environment that is not included in the set of environments.

17. The computer-readable storage medium of claim 16, wherein the comparing comprises the electronic device receiving, from one or more third electronic devices, historical information that specifies or that corresponds to the historical values of the one or more distortions of the sensor.

18. A method for selectively authenticating an individual, comprising:

by an electronic device:

receiving, from a second electronic device, information that specifies or that corresponds to one or more distortions of a sensor and one or more environmentally dependent distortions associated with a set of environments, wherein the second electronic device comprises the sensor that performs measurements of a physical parameter and the measurements of the physical parameter performed by the sensor comprise the one or more distortions associated with the sensor, wherein the one or more distortions of the sensor comprise semi-stable, time variation of the one or more distortions of the sensor are associated with an internal makeup of the sensor, and the one or more distortions of the sensor vary among different instances of the sensor, wherein the measurements of the physical parameter further comprise the one or more environmentally dependent distortions associated with the set of environments, and wherein the sensor has an accuracy exceeding a manufacturer specification associated with the electronic device;

determining, based at least in part on the information, the one or more distortions of the sensor and the one or more environmentally dependent distortions associated with the set of environments;

comparing the determined one or more distortions of the sensor with historical values of the one or more distortions of the sensor and the one or more environmentally dependent distortions associated with the set of environments with historical values of the one or more environmentally dependent distortions associated with the set of environments; and selectively authenticating the individual associated with the second electronic device based at least in part on the comparisons, wherein, during a given time interval, the selective authentication is denied when the second electronic device is located in a second environment that is not included in the set of environments.

19. The method of claim 18, wherein the comparing comprises the electronic device receiving, from one or more third electronic devices, historical information that specifies or that corresponds to the historical values of the one or more distortions of the sensor.

20. The method of claim 18, wherein the information that specifies or that corresponds to the one or more distortions of the sensor does not comprise the measurements of the physical parameter.

* * * * *